H. W. WAKEFIELD & C. F. HARTER.
COMBINED CREEL AND KIT.
APPLICATION FILED JAN. 15, 1909.
938,293.
Patented Oct. 26, 1909.
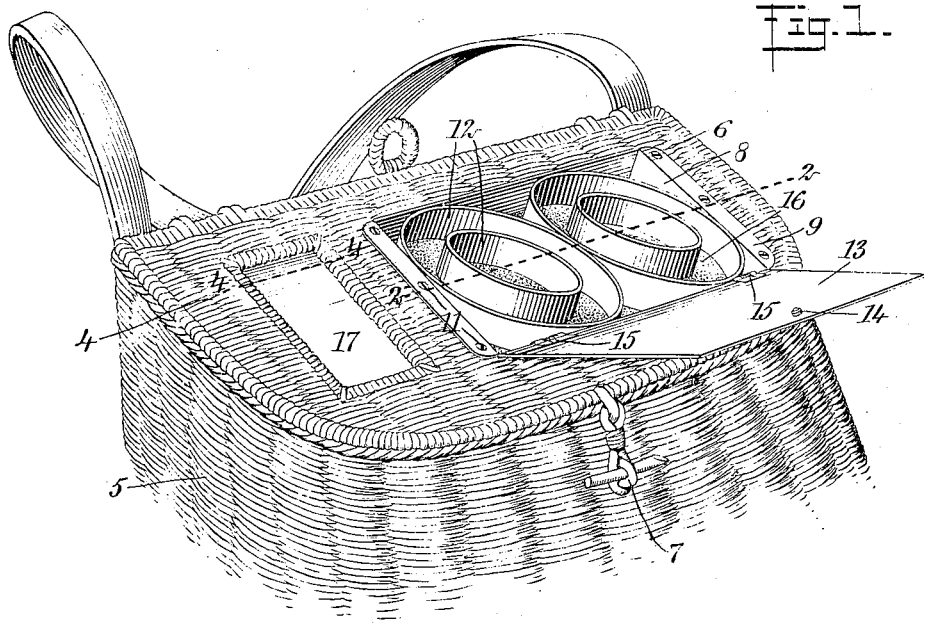
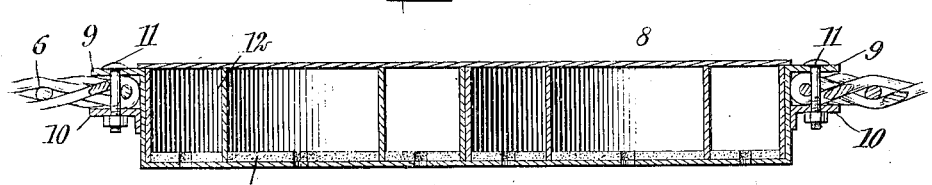
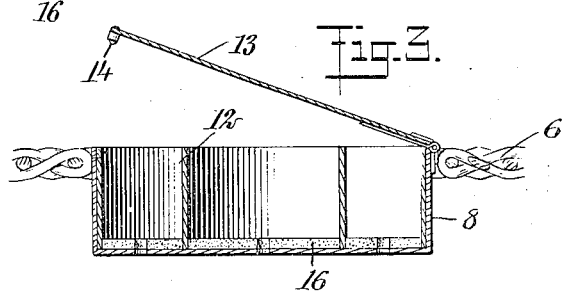
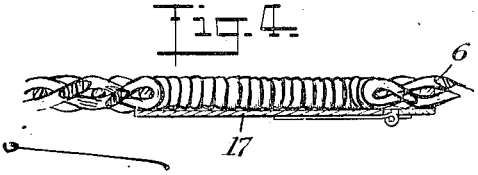
WITNESSES
INVENTORS
Hayes W. Wakefield
Charles F. Harter
BY
ATTORNEYS

UNITED STATES PATENT OFFICE.

HAYES WALTER WAKEFIELD AND CHARLES FRANKLIN HARTER, OF SEATTLE, WASHINGTON.

COMBINED CREEL AND KIT.

938,293. Specification of Letters Patent. Patented Oct. 26, 1909.

Application filed January 15, 1909. Serial No. 472,569.

*To all whom it may concern:*

Be it known that we, HAYES W. WAKEFIELD and CHARLES F. HARTER, both citizens of the United States, and residents of Seattle, in the county of King and State of Washington, have invented a new and Improved Combined Creel and Kit, of which the following is a full, clear, and exact description.

This invention has reference to improvements in anglers' creels, the purpose of which is the provision of a kit in connection with the creel or basket, for the storing of hooks, lines, leaders and other fishing paraphernalia, in order that the same may be at all times readily accessible and thus facilitate the replacing of lost hooks, etc. In attaining this object we preferably apply our improvements to the top of a creel of conventional form which we provide with a rectangular kit having annular concentrically-arranged walls therein forming circular fishing line storage compartments and corner fishing tackle storage compartments, the kit being further provided with an insulated bottom to prevent the heating of the creel, and having drainage openings to permit of the water from wet lines, etc. to run out.

Reference is to be had to the accompanying drawings forming a part of this specification, in which similar characters of reference indicate corresponding parts in all the views.

Figure 1 is a perspective view of a creel or basket having our improvements applied thereto; Fig. 2 is a section through the kit, substantially on the line 2—2 of Fig. 1, illustrating the manner in which it is connected with the basket; Fig. 3 is a section through the kit at right-angles to the section shown in Fig. 2; and Fig. 4 is a section on the line 4—4 of Fig. 1, showing the arrangement and construction of the spring-pressed or trap door.

In carrying out our invention any customary or other form of creel or basket 5 may be made use of, the same being modified only in the construction of its top 6, which top is generally hinged at the inner edge and provided at its opposite and free edge with a suitable fastening 7. In connection with the top 6 is a kit 8, forming a primary feature of our improvements, the same being constructed of sheet metal, such as aluminum or any other suitable material, and is provided with an outwardly-turned marginal flange 9 at its upper edge adapted to rest directly on the top 6, and in connection with a similar flange 10, grip the edge of the top about an opening formed therein for the reception of the body of the kit, as shown in Fig. 2, the two flanges 9 and 10, which, in the present embodiment of our invention are shown as arranged at the ends of the kit only, being forced together by bolts 11.

Within the kit are formed one or more sets of approximately concentric compartments by the circular walls 12, preferably equal in height to the side walls of the kit. Two sets of compartments are shown in the form of our invention illustrated, each being made up of two of the concentric walls 12, which, in connection with the side walls of the kit, form small annular compartments which are convenient for small articles used by the angle. At the outer edge of the kit a lid 13 is hinged, which is provided with a button 14 for locking it in closed position, and has one or more springs 15, preferably in connection with the hinges, normally operating to force the lid open, as shown in Fig. 1. The annular compartments of the kit are of convenient shape for storing lines and preventing the same from being tangled. They also offer storage room for hooks, leaders and other paraphernalia generally useful to anglers, and as these articles are at all times within the creel, the restoring of lost hooks, lines, etc. is obviously facilitated.

In the bottom of the several compartments of the creel is placed a layer of felt 16, which has an opening or perforation in each compartment in register with a similar opening or perforation formed in the material of the kit, through which water is adapted to drain into the basket. The felt serves as an insulation and prevents any substantial heating of the interior of the basket by reason of the kit. At one side of the kit the top of the creel is constructed with a further opening which is normally closed by a spring-pressed or trap door 17 which opens inwardly, this construction obviously admitting of the convenient passage of the fish into the creel but effectively preventing the escape of the fish therefrom, since directly after the door is depressed in introducing the fish, the door is returned to closed position under the influence of its spring.

Having thus described our invention, we claim as new and desire to secure by Letters Patent:

1. The combination of a creel, and a kit attached to the top of the creel, having an insulated bottom provided with drainage openings.

2. The combination of a creel, and a kit arranged in the top of the creel, having drainage openings.

In testimony whereof we have signed our names to this specification in the presence of two subscribing witnesses.

HAYES WALTER WAKEFIELD.
CHARLES FRANKLIN HARTER.

Witnesses:
R. J. HUSTON,
A. J. WALTERS.